Patented Nov. 4, 1941

2,261,779

UNITED STATES PATENT OFFICE 2,261,779

ALUMINUM BRONZE WELDING ROD

Edward Anthony Rutt, Detroit, Mich., assignor, by mesne assignments, to Ampco Metal, Inc., Milwaukee, Wis., a corporation of Wisconsin No Drawing. Application July 29, 1940, Serial No. 348,172

4 Claims. (Cl. 219—8)

This invention relates to aluminum bronze welding rods and has found particular advantage in its application to aluminum-iron bronzes such as "Ampco."

In the covering of aluminum bronze rods with fluxes for welding, it has been found that various mixtures of fluorides and chlorides are suitable for providing the protection required against oxidation of the aluminum during welding. In most instances the composition of the coverings were complicated and several ingredients were employed to obtain the right type of slag. This had the disadvantage of requiring uniformity of the mixing and of application to the rod in order to obtain consistency in performance.

Where a coating was applied, as by dipping, it was found to be difficult to maintain the bath in a uniform state of mixture and consistency. The more ingredients employed, the more this difficulty became.

The present invention is based on the discovery that a very satisfactory welding rod can be produced for the welding of aluminum bronze, employing a very simple coating composition which can be applied uniformly and without difficulty to the rod.

The principal object of the invention is to provide a coated aluminum bronze welding electrode which can be manufactured with greater uniformity and which is efficient in protecting the weld metal to give sound deposits of satisfactory quality.

In preparing a batch of coating composition, a single flux ingredient is first mixed with a small amount of binder and then water is added in sufficient amount to provide the right viscosity for dipping of the rods.

The preferred flux is sodium fluoride alone, since this material has the requisite qualities of producing a slag which protects the deposited metal from loss and oxidation. Cryolite has also been found to be satisfactory, alone.

The binder is preferably sodium silicate of a neutral grade with respect to acidity, known in the trade as grade "U". Other binders may be employed, such as dextrine, although the latter should not be used if the electrodes are to be handled roughly or kept for a long time since it has a tendency to allow the coating to become friable and spall off.

The flux employed is preferably from three to six times the amount of the binder, by weight. Only enough binder should be employed to hold the coating on the rod until used.

The water added is for the purpose of providing the right viscosity for dipping and will vary with the thickness of coating desired.

After the composition is made up in a bath, the rods are dipped in the bath to within an inch or two of the upper end of the rod, and then withdrawn. The dipping should be vertical, since lateral movement of the rod when coming out of the bath may create eccentricity of the coating. Furthermore, the speed of dipping should be uniform and adjusted to the viscosity in each given case to produce a uniformly thick coating from end to end of the rod. Eleven seconds has been found to be a good time cycle for dipping under average conditions.

After dipping, the rods with their coatings on are set in racks to dry either in an open room or in an oven as is usual in welding electrode manufacture.

By providing only a single fluxing ingredient there is no tendency of the bath to become striated with different ingredients predominating at different levels. All of the covering on the rod will be of one fluxing material, and given uniformity in thickness, there will be uniform performance of the covering from end to end of the rod. Any difference in viscosity of the bath from top to bottom will only effect the final thickness of coating obtained and not its uniformity.

The invention is claimed as follows:

1. An arc welding electrode of aluminum bronze having a coating thereon of a single fluxing material, preferably a fluoride, and a small amount of binding material.

2. An arc welding electrode of aluminum bronze having a dipped and dried coating thereon of sodium fluoride and a small amount of binder.

3. An arc welding electrode of aluminum bronze having a dipped and dried coating thereon of cryolite and a small amount of binder.

4. An arc welding electrode of aluminum bronze rod having a coating thereon of a single flux forming material, preferably a fluoride, and a binder, said flux forming material and binder being in excess of the ratio of six to one.

EDWARD ANTHONY RUTT.